(12) United States Patent
Tuchiya

(10) Patent No.: US 6,826,766 B2
(45) Date of Patent: Nov. 30, 2004

(54) DISK APPARATUS

(75) Inventor: Tatuhiko Tuchiya, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 82 days.

(21) Appl. No.: 10/353,796

(22) Filed: Jan. 28, 2003

(65) Prior Publication Data

US 2003/0161243 A1 Aug. 28, 2003

(30) Foreign Application Priority Data

Jan. 30, 2002 (JP) .................................... 2002-020856

(51) Int. Cl.⁷ ........................... G11B 17/04; G11B 33/02
(52) U.S. Cl. .................................. 720/620; 369/77.11
(58) Field of Search .................... 720/620; 369/77.11, 369/77.21, 75.11, 75.21, 77.1, 77.2

(56) References Cited

U.S. PATENT DOCUMENTS

| | | | | |
|---|---|---|---|---|
| 5,872,757 A | | 2/1999 | Park | |
| 6,222,811 B1 | * | 4/2001 | Sakurai et al. | 369/77.1 |
| 6,256,280 B1 | * | 7/2001 | Sakurai et al. | 369/77.1 |
| 6,512,730 B1 | * | 1/2003 | Lee et al. | 369/77.1 |
| 2002/0159373 A1 | * | 10/2002 | Saji et al. | 369/77.1 |
| 2003/0099182 A1 | * | 5/2003 | Maeda et al. | 369/77.1 |

* cited by examiner

*Primary Examiner*—Allen Cao
(74) *Attorney, Agent, or Firm*—Brinks Hofer Gilson & Lione

(57) ABSTRACT

In a disk apparatus in which either a large-diameter disk or a small-diameter disk can be loaded, a pair of detecting projections and a pair of positioning projections are provided in a disk loading path, and a pair of selection grooves are formed in a chassis. Each of the selection grooves includes a first guide groove and a second guide groove. The positioning projections operate inside the first grooves when the opposing distance between the detecting projections is increased by a small-diameter disk, and they are pressed into the second guide grooves by the peripheral edge of the large-diameter disk when the opposing distance is increased by a large-diameter disk. The small-diameter disk is positioned by the positioning projections placed in the first guide grooves, and the large-diameter disk is positioned by the positioning projections placed in the second guide grooves.

25 Claims, 15 Drawing Sheets

DISK APPARATUS

BACKGROUND

1. Field of the Invention

The present invention relates to a disk apparatus in which a plurality of types of disks having different diameters are loaded, and more particularly, to a disk apparatus in which both a large-diameter disk and a small-diameter disk can be reliably positioned with a simple structure.

2. Description of the Related Art

In disk apparatuses in which a disk is automatically loaded in order to play back information recorded on the disk or to record information on the disk, the loaded disk must be reliably positioned on a turntable in a rotating section. In disk apparatuses capable of loading two types of disks, that is, a small-diameter disk having a diameter of 8 cm and a large-diameter disk having a diameter of 12 cm, both the disks must be positioned.

For that purpose, some conventional disk apparatuses have, on the inner side, a positioning projection which the peripheral edge of a loaded disk abuts. The positioning projection is placed so that the peripheral edge of a small-diameter disk having a diameter of 8 cm abuts it. When a large-diameter disk having a diameter of 12 cm is loaded, the positioning projection is pressed by the large-diameter disk and abuts a stopper formed on the rear side. In this state, the large-diameter disk is positioned with its peripheral edge in contact with the positioning projection.

In the conventional disk apparatuses, when a small-diameter disk is loaded, the loading is detected and the positioning projection is locked in an initial position. When a large-diameter disk is loaded, the loading is detected and the positioning projection is unlocked so that it can move toward the inner side of the apparatus.

Therefore, a plurality of detecting means are necessary to detect whether or not the loaded disk is a small-diameter disk or a large-diameter disk, and a lock mechanism for locking the positioning projection also is necessary. This complicates the construction of the apparatus.

BRIEF SUMMARY

The present invention has been made to overcome the above problems, and an object of the present invention is to provide a disk apparatus of simplified structure in which both a large-diameter disk and a small-diameter disk can be positioned reliably.

According to one aspect, the present invention provides a disk apparatus wherein both a large-diameter disk and a small-diameter disk can be loaded in a chassis and are driven by a common rotating section. The disk apparatus includes a pair of detecting projections provided in a disk loading path and biased in a direction such as to move closer to each other, the detecting projections being pressed by the peripheral edge of the disk so as to change the opposing distance therebetween, and a pair of positioning projections provided in the disk loading path and placed offset from the detecting projections toward the inner side in the disk loading direction, the positioning projections being operated to change the opposing distance therebetween by the moving force of the detecting projections when the detecting projections are pressed by the peripheral edge of the disk. The chassis includes, in a top plate substantially parallel to the surface of a loaded disk, a pair of selection grooves corresponding to the positioning projections, each of the selection grooves including a first guide groove and a second guide groove disposed offset from the first guide groove toward the inner side in the disk loading direction. The selection grooves are shaped so that the positioning projections operate inside the first grooves when the opposing distance between the detecting projections is increased by the small-diameter disk, and so that the positioning projections move out of the first guide grooves and are pressed into the second guide grooves by the peripheral edge of the large-diameter disk when the opposing distance between the detecting projections is increased by the large-diameter disk. The small-diameter disk is positioned so that the center thereof can be placed in the rotating section by the positioning projections placed in the first guide grooves, and the large-diameter disk is positioned so that the center thereof is placed in the rotating section by the positioning projections placed in the second guide grooves.

In the disk apparatus of the present invention, the distance between the detecting projections varies depending on the diameter of the disk, and disks having different diameters are positioned by placing the positioning projections operated by the detecting projections in the first guide grooves and the second guide grooves. Therefore, a complicate detection means for detecting the diameter of the disk is unnecessary, and it is possible to reliably position both a large-diameter disk and a small-diameter disk on the rotating section with a simple structure.

Preferably, when the opposing distance between the detecting projections is increased, the positioning projections are moved closer to each other, the selection grooves are disposed on both sides of a moving line of the center of the disk, and the first guide grooves and the second guide grooves extend in a direction orthogonal to the moving line, and are connected adjacent to the moving line.

Preferably, the detecting projections are each provided at one end of each of a pair of detection arms, and the positioning projections are provided in a pair of positioning members connected to the respective other ends of the detection arms. The positioning projections can move in the selection grooves, and a large-diameter disk and a small-diameter disk abut the positioning projections and are positioned so that the centers thereof can be placed in the rotating section.

Further objects, features, and advantages of the present invention will become apparent from the following description of the preferred embodiments with reference to the attached drawings.

DETAILED DESCRIPTION OF THE DRAWINGS AND THE PRESENTLY PREFERRED EMBODIMENTS

Figure 1:
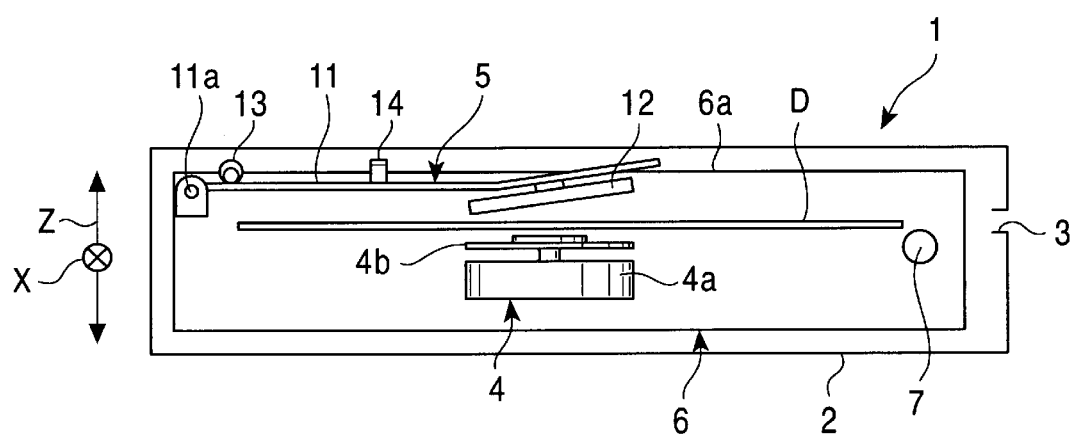
FIG. 1 is a side view schematically showing the general configuration of a disk apparatus according to the present invention.

A disk apparatus 1 shown in FIG. 1 can play back information recorded on small-diameter disks Ds having a diameter of 8 cm and large-diameter disks D having a diameter of 12 cm, such as CDs (compact disks) or DVDs (digital versatile disks), and can record information on the disks.

As shown in FIG. 1, a face section (not shown) having a liquid crystal display panel and various operating switches is provided at the front of a housing 2 that forms the outer shape of the disk apparatus 1. The face section also has a loading slot 3 extending in the widthwise direction (X-direction).

A rotating section 4 and a clamp mechanism 5 are provided inside the disk apparatus 1. The rotating section is positioned below a transfer path for a disk D loaded from the loading slot 3, and the clamp mechanism 5 is positioned above the transfer path. The rotating section 4 includes a spindle motor 4a and a turntable 4b mounted on the rotating shaft of the spindle motor 4a so that the disk D is placed thereon. The clamp mechanism 5 includes a clamp arm 11 and a clamper 12 rotatably mounted at the leading end of the clamp arm 11. The clamp arm 11 is supported by a chassis 6 provided in the housing 2 so that it can pivot on a base end 11a. The clamper 12 is disposed above the turntable 4b so as to be opposed thereto. The clamp arm 11 has a biasing member 13 that constantly biases the clamp arm 11 in a direction such as to press the disk D. The biasing member 13 is formed of a torsion coil spring.

Figure 2:
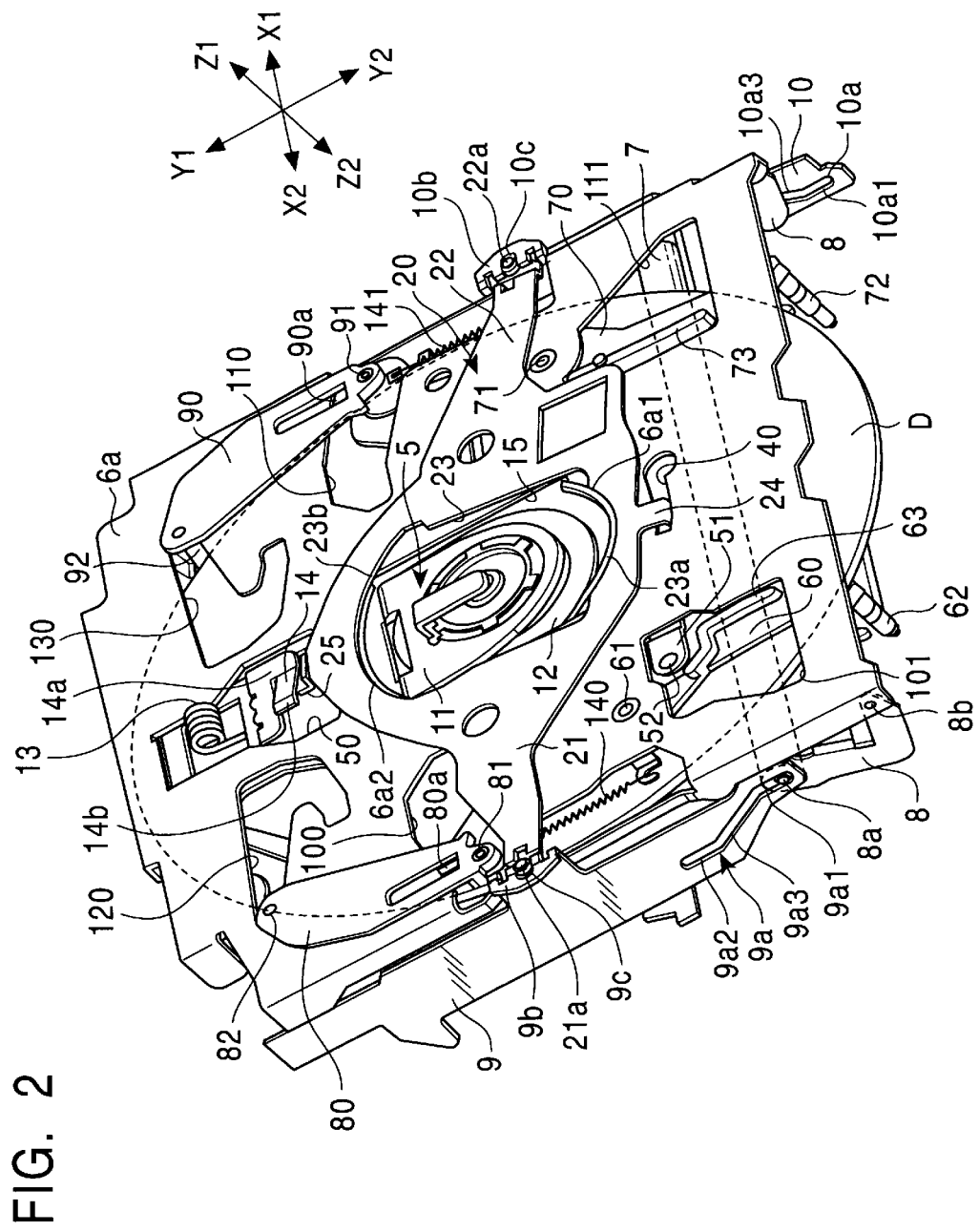
FIG. 2 is a perspective view of the disk apparatus in a disk unclamped state.
Figure 4:
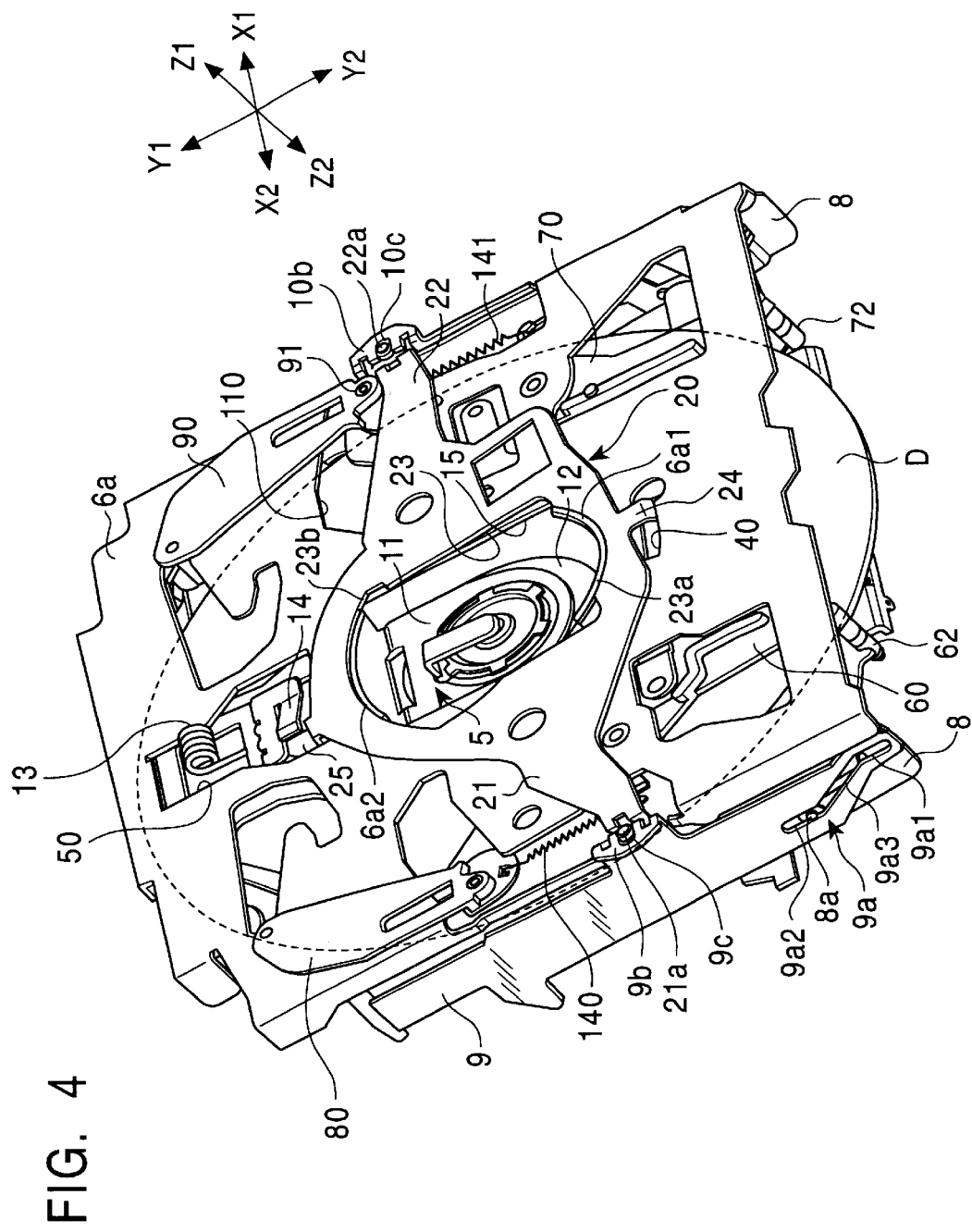
FIG. 4 is a perspective view of the disk apparatus in a disk clamped state.

Inside the chassis 6 at the loading slot 3, a roller 7 is provided as a disk transfer section. The roller 7 extends in the widthwise direction (X-direction). As shown in FIGS. 2 and 4, base ends of L-shaped pivot arms 8 are supported on both side faces of the chassis 6 so that they can pivot on shafts 8b, and a shaft 8a protruding from both ends of the roller 7 is supported at the leading ends of the pivot arms 8.

A transfer motor (not shown) is mounted in the chassis 6, and the power of the transfer motor is transmitted to the shaft 8a through a reduction gear train so as to rotate the roller 7 in the forward and reverse directions.

Slide members 9 and 10 are supported on both side faces of the chassis 6, respectively, so that they can slide in the loading and ejecting direction of the disk D (Y-direction). The slide members 9 and 10 have guide holes 9a and 10a, and the shaft 8a is supported therein. The guide hole 9a has an upper guide portion 9a1 and a lower guide portion 9a2 extending in the Y-direction at the front and rear ends thereof. The upper guide portion 9a1 is formed at a higher position than the lower guide portion 9a2. A portion between the guide portions 9a1 and 9a2 serves as an inclined guide portion 9a3.

The guide hole 10a is symmetrical with the guide hole 9a, and has a lower guide portion 10a1 and an upper guide portion (not shown) at the front and rear ends thereof. The lower guide portion 10a1 and the upper guide portion are placed in positions opposite to the upper guide portion 9a1 and the lower guide portion 9a2 in the forward/backward direction. A portion between the lower guide portion 10a1 and the upper guide portion serves as an inclined guide portion 10a3.

As shown in FIG. 2, when the slide member 9 moves toward the rear side (Y1-side) of the disk apparatus 1 and the slide member 10 moves toward the front side (Y2-side) thereof, the shaft 8a of the roller 7 is placed in the upper guide portion 9a1 of the slide member 9 and the upper guide portion of the slide member 10, and the roller 7 reaches a height at which it can apply a transfer force to the lower surface of the disk D.

As shown in FIG. 4, when the slide member 9 moves toward the front side (Y2-side) of the disk apparatus 1 and the slide member 10 moves toward the rear side (Y1-side) thereof, the shaft 8a of the roller 7 is placed in the lower guide portion 9a2 of the slide member 9 and the lower guide portion 10a2 of the slide member 10, and the roller 7 separates from the lower surface of the disk D and lowers to a height at which it cannot apply a transfer force to the lower surface of the disk D.

The chassis 6 is elastically supported by an elastic support member, such as an oil damper, an air damper, or a coil spring, inside the housing 2. Therefore, when the disk apparatus 1 is mounted in a vehicle, vehicle vibration acts from the housing 2 onto the chassis 6 through the elastic support member.

A lock mechanism (not shown) is provided between the slide members 9 and 10 and the housing 2. When the slide member 9 moves in the Y1-direction, the slide member 10 moves in the Y2-direction, and the roller 7 is placed at a position such as to transfer the disk D, as shown in FIG. 2, the chassis 6 is locked inside the housing 2 by the lock mechanism. This allows the disk D loaded from the loading slot 3 to be stably guided to the rotating section 4 in the chassis 6. Conversely, when the slide member 9 moves in the Y2-direction, the slide member 10 moves in the Y1-direction, and the roller 7 separates from the disk D, the chassis 6 is unlocked from the lock mechanism, and is elastically supported in the housing 2 by the elastic support member.

A position-switching member 20 is provided on the upper surface of a top plate 6a that forms an upper wall (Z1-side wall) of the chassis 6. The position-switching member 20 has switching arms 21 and 22 extending toward the slide members 9 and 10. Connecting pins 21a and 22a are fixed at the leading ends of the switching arms 21 and 22, respectively, so that they extend upward in the Z-direction.

Upper edge portions of the slide members 9 and 10 partially extend upward in the Z-direction, and the leading ends of the portions are perpendicularly bent outward to form guide pieces 9b and 10b. The guide pieces 9b and 10b have U-shaped slide recesses 9c and 10c, and the connecting pins 21a and 22a slidably extend in the slide recesses 9c and 10c.

A through opening 23 is vertically formed at a center portion of the position-switching member 20, and the top plate 6a also has an opening 15. The leading end of the clamp arm 11 and the clamper 12 in the clamp mechanism 5 are exposed through the openings 23 and 15.

Guide portions 6a1 and 6a2 are formed at the front and rear edges of the opening 15 of the top plate 6a. The guide portions 6a1 and 6a2 are formed by bending portions of the top plate 6a upward at the edges of the opening 15. The outer peripheral surfaces of the guide portions 6a1 and 6a2 are shaped like a partial arc, and are positioned on the same arc.

Sliding faces 23a and 23b are formed at the front and rear edges of the opening 23 of the position-switching mechanism 20. The sliding faces 23a and 23b are shaped like a partial arc, and are positioned on the same arc. The radius of curvature of the arc is substantially equal to the radius of curvature of the outer peripheral surfaces of the guide portions 6a1 and 6a2. When the sliding faces 23a and 23b slide on the outer peripheral surfaces of the guide portions 6a1 and 6a2, the position-switching member 20 rotates on the top plate 6a about the center of curvature of the arc.

A guide hole 40 is formed in the top plate 6a in the center portion offset from the position-switching member 20 toward the front side. A guide claw 24 is bent integrally with the front edge of the position-switching member 20. The guide claw 24 is inserted in the guide hole 40, and the leading end thereof bent along the lower side of the top plate 6a. The engagement between the guide claw 24 and the guide hole 40 prevents the position-switching member 20 from easily slipping upward out of the top plate 6a.

A cutout 50 is formed in the top plate 6a offset rearward from the position-switching member 20 so that a part of the clamp arm 11 is exposed therefrom. An engaging portion 14 is formed integrally with the clamp arm 11 between the base end 11a and the leading end having the clamper 12, and is exposed in the cutout 50.

Figure 3:
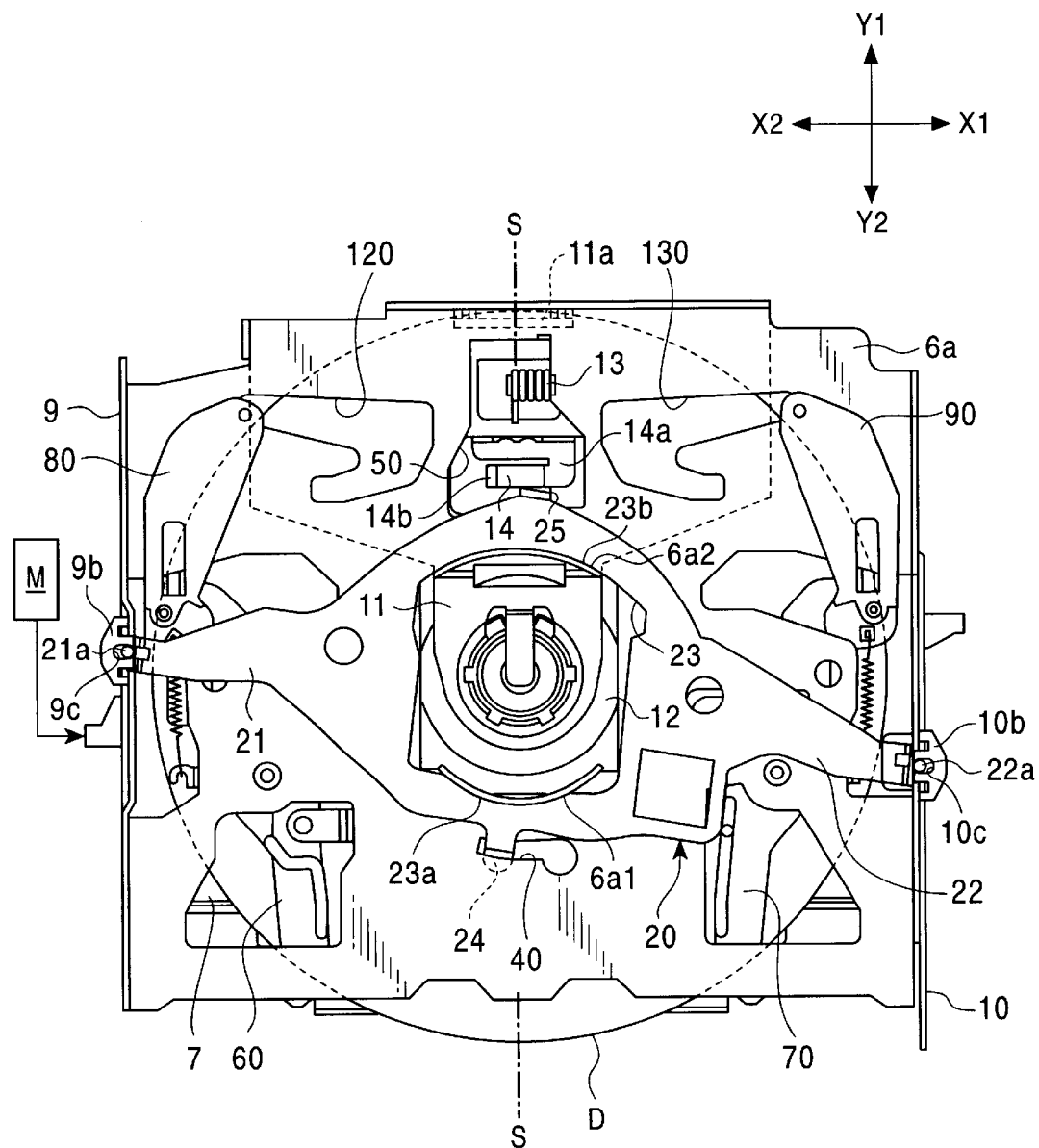
FIG. 3 is a plan view of the disk apparatus in the disk unclamped state.

When a center line extending in the Y-direction through the center of rotation of the clamper 12 (moving center line of the disk D) is designated S, as shown in FIG. 3, the engaging portion 14 has a base end portion 14a and a leading end portion 14b on the X1 and X2 sides of the center line S. The lower surface of the engaging portion 14 is an inclined face that gradually rises from the base end portion 14a toward the leading end portion 14b.

A lifting portion 25 protrudes integrally from the center of the rear edge of the position-switching member 20. The leading end of the lifting portion 25 extends below the top plate 6a through the cutout 50.

Figure 5:
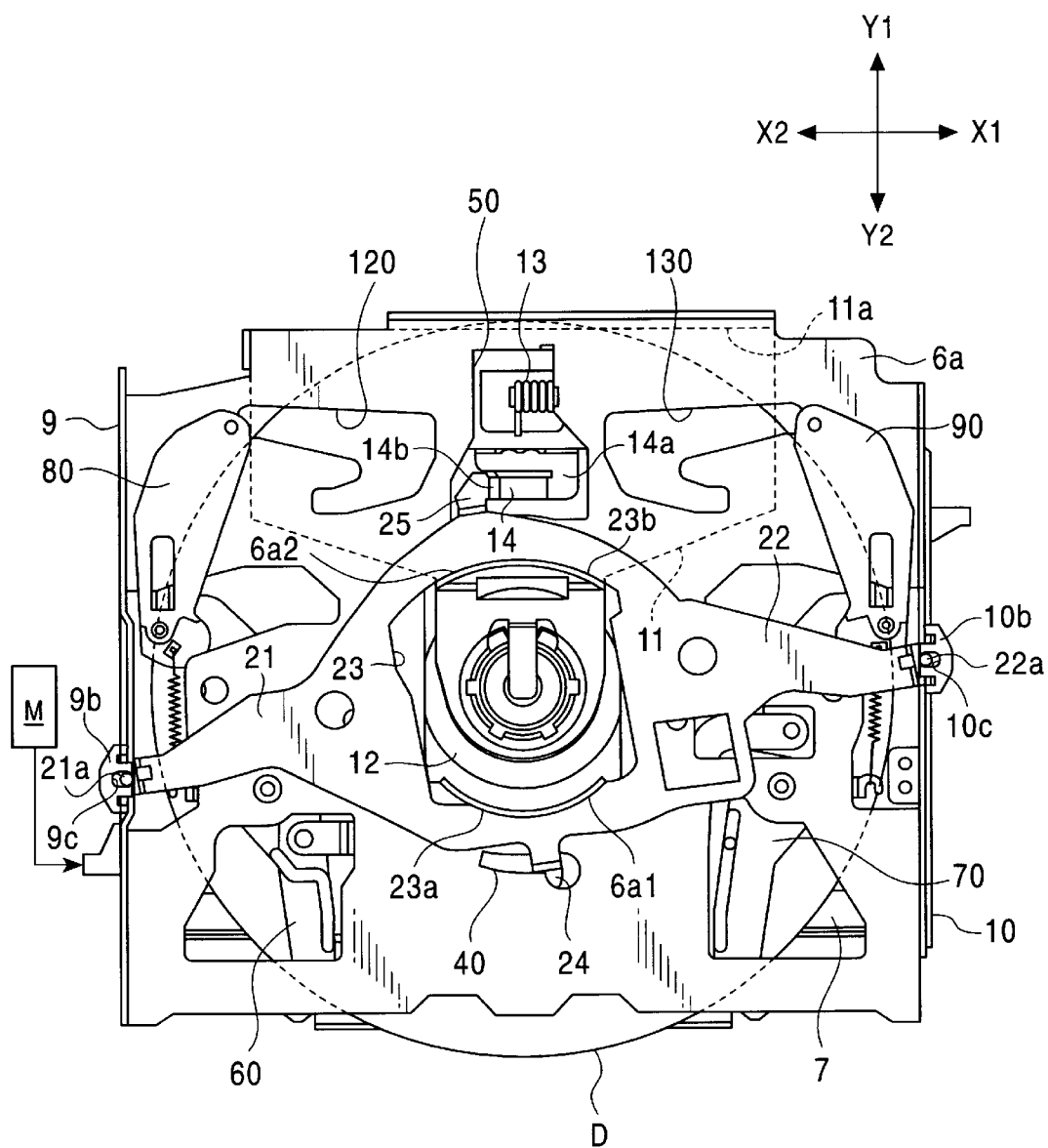
FIG. 5 is a plan view of the disk apparatus in the disk clamped state.

As shown in FIGS. 3 and 5, a motor M is provided in the housing 2. The power of the motor M is transmitted to one of the slide members 9 to drive the slide member 9 in the forward/backward direction (Y-direction). The force of forward and backward movement of the slide member 9 is transmitted to the position-switching member 20, and to the slide member 10. Therefore, when the slide member 9 is driven in the forward/backward direction by the motor M, the position-switching member 20 turns, and the slide member 10 moves in a direction opposite to the slide member 9.

In a state shown in FIGS. 4 and 5, since the position-switching member 20 is turned counterclockwise and the lifting portion 25 is not engaged with the engaging portion 14, the clamp arm 11 is biased down to a clamp position by the biasing force of the biasing member 13. When the slide member 9 is driven in the Y1-direction by the motor M from this state, as shown in FIGS. 2 and 3, the position-switching member 20 turns clockwise on the upper surface of the top plate 6a, and the lifting portion 25 moves under the lower surface of the base end portion 14a while sliding on the lower surface of the engaging portion 14 of the clamp arm 11. Consequently, the clamp arm 11 is lifted to an unclamping position.

Conversely, when the slide member 9 is driven in the Y2-direction by the motor M from the unclamping state shown in FIGS. 2 and 3, the position-switching member 20 turns counterclockwise, and the lifting portion 25 moves out of the base end portion 14a of the engaging portion 14 and slides on the inclined face of the engaging portion 14. With this movement, the clamp arm 11 is moved down by the biasing member 13, and the clamper 12 is pressed against the rotating section 4, thereby clamping the disk D on the turntable 4b.

Since the position-switching member 20 is located above the disk D in the above-described clamp mechanism, the engaging position between the clamp arm 11 and the position-switching member 20 can be freely set at any position along the total length of the clamp arm 11. Therefore, the engaging position can be set at a distance from the base end 11a of the clamp arm 11. This reduces the force to be applied when the clamp arm 11 is lifted.

Since the position-switching member 20 rotates along the upper surface of the top plate 6a, a wide moving space for the position-switching member 20 is unnecessary. The opening 23 of the position-switching member 20 and the opening 15 of the top plate 6a face the clamper 12 at the leading end of the clamp mechanism 5, and the clamp arm 11 and the clamper 12 partially project in the openings 15 and 23 in the unclamping state shown in FIG. 2. This eliminates the necessity of providing a vertically large space between the clamp mechanism 5 and the top plate 6a, and reduces the thickness of the apparatus.

A description will now be given of a mechanism for guiding and positioning the disk D. FIGS. 7 to 15 illustrate the operation of guiding and positioning the disk D. In these figures, the position-switching member 20, the clamp mechanism 5, and the rotating section 4 in the disk apparatus 1 are not shown.

Figure 6:
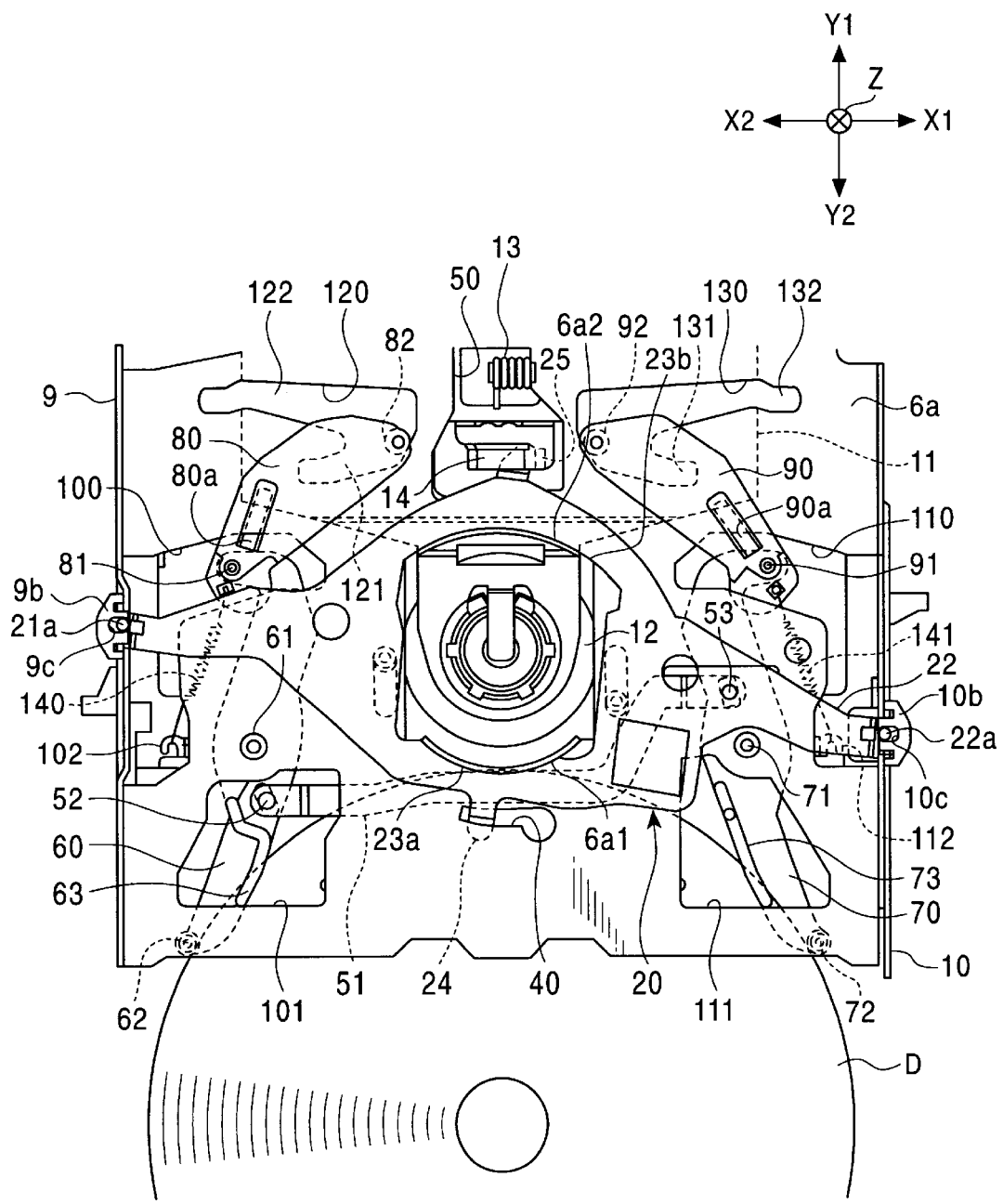
FIG. 6 is a plan view showing a state in which loading of a disk is started.

As shown in FIG. 6, a pair of detection arms 60 and 70 and a pair of positioning members 80 and 90 operated by the detection arms 60 and 70 are provided on both sides in the X-direction in the chassis 6 of the disk apparatus 1.

The detection arm 60 and the positioning member 80 are connected on the X2-side of the center line S, and the detection arm 70 and the positioning member 90 are connected on the X1-side. The detection arm 60 and the positioning member 80, and the detection arm 70 and the positioning member 90 are arranged in left-right symmetry.

The detection arms 60 and 70 are rotatably mounted on the back side of the top plate 6a. The positioning members 80 and 90 are mounted on the top side of the top plate 6a. Connecting holes 100 and 110 are formed in the X-direction on both sides of the top plate 6a. The detection arms 60 and 70 and the positioning members 80 and 90 are pivotally connected at one end by connecting pins 81 and 91 inside the holes 100 and 110, respectively.

The detection arm 60 and the detection arm 70 extend rearward from the front end of the chassis 6, and are pivotally supported by shafts 61 and 71 formed on the top plate 6a. Detecting projections 62 and 72 protrude downward (toward the Z2-side) from the leading ends of the detection arms 60 and 70. Guide bars 63 and 73 respectively protrude integrally from the upper surfaces of the detection arms 60 and 70 between the shafts 61 and 71 and the detecting projections 62 and 72. Generally rectangular through holes 101 and 111 are formed in both front sides in the X-direction of the top plate 6a. The guide bars 63 and 73 of the detection arms 60 and 70 protrude upward from the top plate 6a through the through holes 101 and 111.

The detection arm 60 and the detection arm 70 are connected by a connecting member 51. The connecting member 51 is elongated and is positioned below the top plate 6a. A cylindrical small projection 52 is formed at one end of the connecting member 51, and extends in a hole formed in the detection arm 60. A cylindrical small projection 53 is formed at the other end of the connecting member 51, and extends in a hole formed in the detection arm 70.

The small projection 52 is disposed offset from the turning shaft 61 toward the Y2-side, and the small projection 53 is disposed offset from the rotating shaft 71 toward the Y1-side. Therefore, the detection arm 60 and the detection arm 70 synchronously rotate in opposite directions through the connecting member 51. That is, the detecting projection 62 and 72 are operatively connected so that they move closer to or further apart from each other.

On the rear side (Y1-side) of the disk apparatus 1, a pair of positioning selection grooves 120 and 130 that are symmetrical with respect to the center line S are formed in the right and left sides of the top plate 6a. The positioning selection grooves 120 and 130 are bifurcated, and include first guide grooves 121 and 131 and second guide grooves 122 and 132 connected to the first guide grooves 121 and 131, respectively. The first selection grooves 121 and 131 are formed toward the side of the loading slot 3 so as to be selected when a small-diameter disk Ds is positioned. The second guide grooves 122 and 132 are formed offset from the first guide grooves 121 and 131 toward the rear side so as to be selected when a large-diameter disk D is positioned. The first guide grooves 121 and 131 are symmetrical with respect to the center line S along which the center of a loaded disk D moves, and extend toward the right and left sides (in a direction crossing the center line S). This also applies to the second guide grooves 122 and 132. The first guide groove 131 and the second guide groove 132 on the X1-side and the first guide groove 121 and the second guide groove 122 on the X2-side are connected at their ends close to the center line S, thereby forming substantially V-shaped positioning selection grooves 120 and 130.

A clamp piece 80a is formed integrally with the positioning member 80. The clamp piece 80a extends under the top plate 6a, and the top plate 6a is thereby retained between the positioning member 80 and the clamp piece 80a. Consequently, the positioning member 80 can move along the top plate 6a without separating from the upper surface of the top plate 6a. A positioning projection 82 fixed at the leading end of the positioning member 80 so as to extend downward (toward the Z2-side) extends below the top plate 6a through the positioning selection groove 120. Similarly, a clamp piece 90a is formed on the positioning member 90 and extends under the top plate 6a. A positioning projection 92 fixed at the leading end of the positioning member 90 so as to extend downward extends below the top plate 6a through the positioning selection groove 130.

The top plate 6a includes hooks 102 and 112. A coil spring 140 is provided between hook 102 and the base end of the positioning member 80. The detection arm 60 is biased counterclockwise through the positioning member 80 by the tensile force of the coil spring 140. A coil spring 141 is provided between the other hook 112 and the base end of the other positioning member 90. The detection arm 70 is biased clockwise through the positioning member 90 by the tensile force of the coil spring 141.

Figure 7:
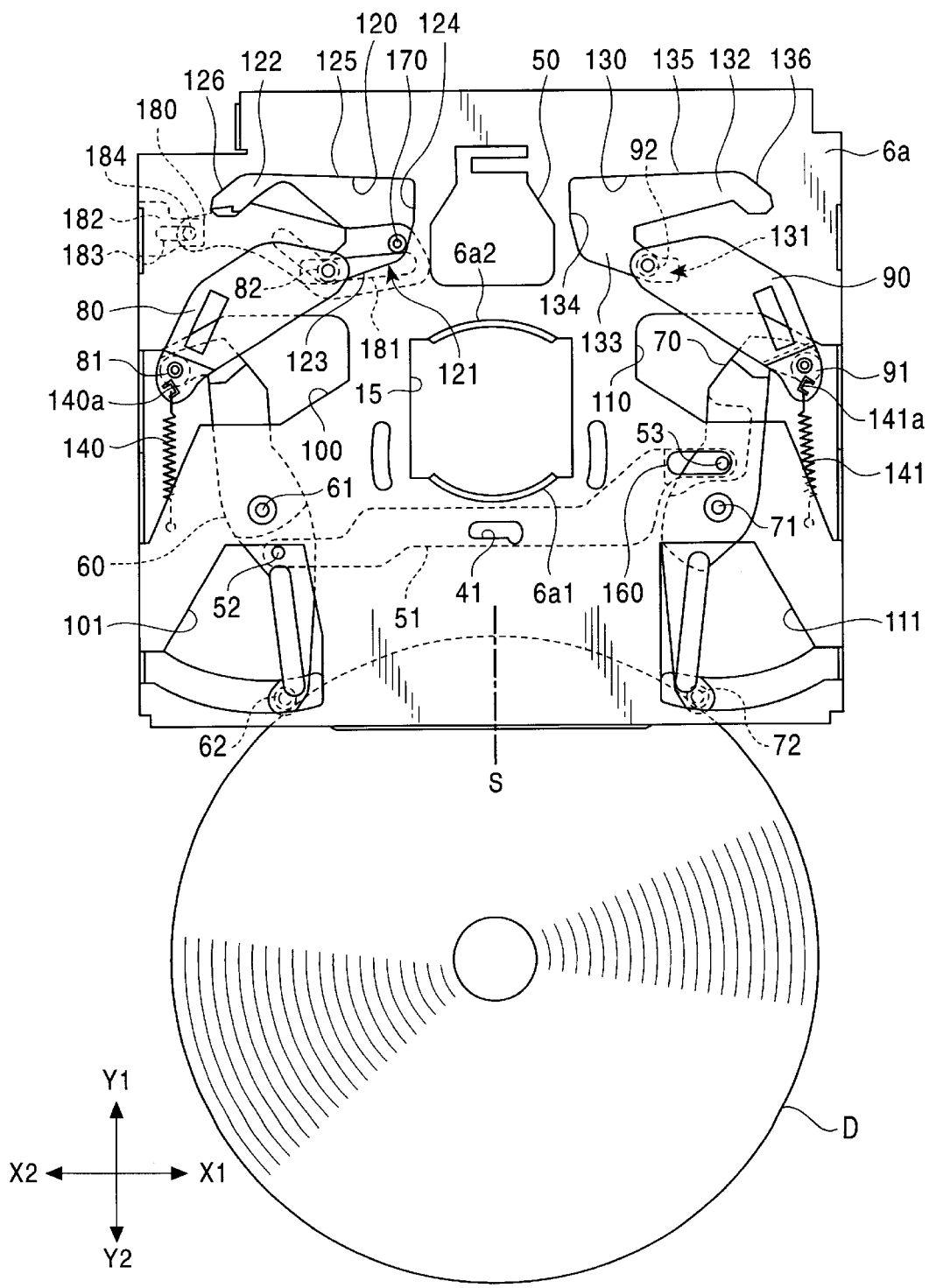
FIG. 7 is a plan view showing a state before a large-diameter disk is loaded.

As shown in FIG. 7, a connecting point 140a between the positioning member 80 and the coil spring 140 is close to the connecting pin 81, and the positioning member 80 is held, by the tension force of the coil spring 140, in a state in which the connecting pin 81 is placed on the same axis as the coil axis of the coil spring 140 (on the extension line of the coil axis). A connecting point 141a between the positioning member 90 and the coil spring 141 is also close to the connecting pin 91, and the positioning member 90 is held, by the tension force of the coil spring 141, in a state in which the connecting pin 91 is placed on the same axis as the coil axis of the coil spring 141 (on the extension line of the coil axis).

Figure 8:
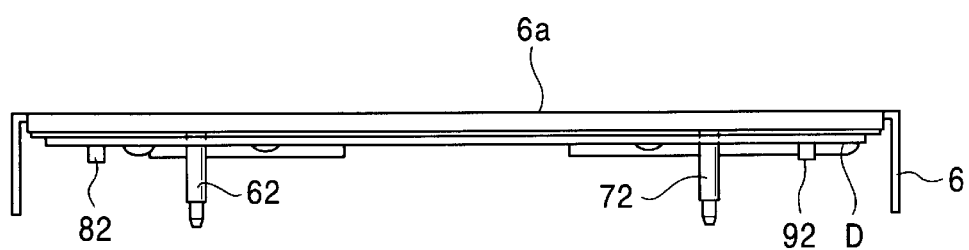
FIG. 8 is a front view of the disk apparatus.

FIG. 8 is a front view of the chassis 6. The detecting projections 62 and 72 extend downward so that they touch the peripheral edge of a disk D loaded from the loading slot 3. The positioning projections 82 and 92 also extend downward so that they touch the peripheral edge of the disk D that is transferred by the roller 7.

A description will now be given of the operation of the disk apparatus 1 according to the present invention.

Either a small-diameter disk Ds having a diameter of 8 cm and a large-diameter disk D having a diameter of 12 cm can be loaded into the disk apparatus 1. The operations of loading and positioning a large-diameter disk D will be described first with reference to FIGS. 7 to 12.

In the disk apparatus 1 before a disk is loaded therein, as shown in FIG. 7, the detection arm 60 is rotated counterclockwise by the coil spring 140 and the detection arm 70 is rotated clockwise by the coil spring 141. Accordingly, the distance between the detecting projection 62 and the detecting projection 72 is smaller so that a disk loaded from the loading slot 3 touches the detecting projections 62 and 72 whether the disk is a large-diameter disk D or a small-diameter disk Ds.

In this state, the positioning projections 82 and 92 are placed in the first guide grooves 121 and 131 of the positioning selection grooves 120 and 130.

In the state in which a disk is not loaded, the slide member 9 is moved toward the rear side (Y1-side) of the disk apparatus 1, the slide member 10 is moved toward the loading slot 3 (Y2-side), and the position-switching member 20 is turned clockwise. The lifting portion 25 is placed under the base end portion 14a of the engaging portion 14, the clamp arm 11 is lifted, and the clamper 12 separates from the turntable 4b and is placed into an unclamping state.

The roller 7 is lifted by the guide holes 9a and 10a of the slide members 9 and 10 to a height such as to apply a transfer force to a loaded disk in contact with the lower surface of the disk.

When a large-diameter disk D having a diameter of 12 cm is loaded from the loading slot 3 of the disk apparatus 1 in the state shown in FIG. 7, the peripheral edge of the disk D abuts the detecting projections 62 and 72. When the disk D abuts the detecting projections 62 and 72 or is slightly pushed in contact with the detecting projections 62 and 72, a detecting means (not shown) detects that the disk D is being loaded into the disk apparatus 1, and the roller 7 is then driven by a motor (not shown).

Subsequently, the disk D is pulled in the Y1-direction by the rotating force of the roller 7. In this case, the detecting projection 62 is pressed in the X2-direction by the peripheral edge of the disk D, and the detection arm 60 is rotated about the shaft 61 clockwise. Similarly, the detecting projection 72 is pressed in the X1-direction, and the detection arm 70 is rotated about the shaft 71 counterclockwise.

Since the detection arm 60 and the detection arm 70 are connected by the connecting member 51, they rotate in driving association with each other, and the distance between the center line S passing through the center of rotation of the turntable 4b and the detecting projection 62 and the distance between the center line S and the detecting projection 72 are constantly equal to each other. Therefore, the disk D is guided and transferred in the Y1-direction while the center of the disk D passes through the center line S.

Figure 9:
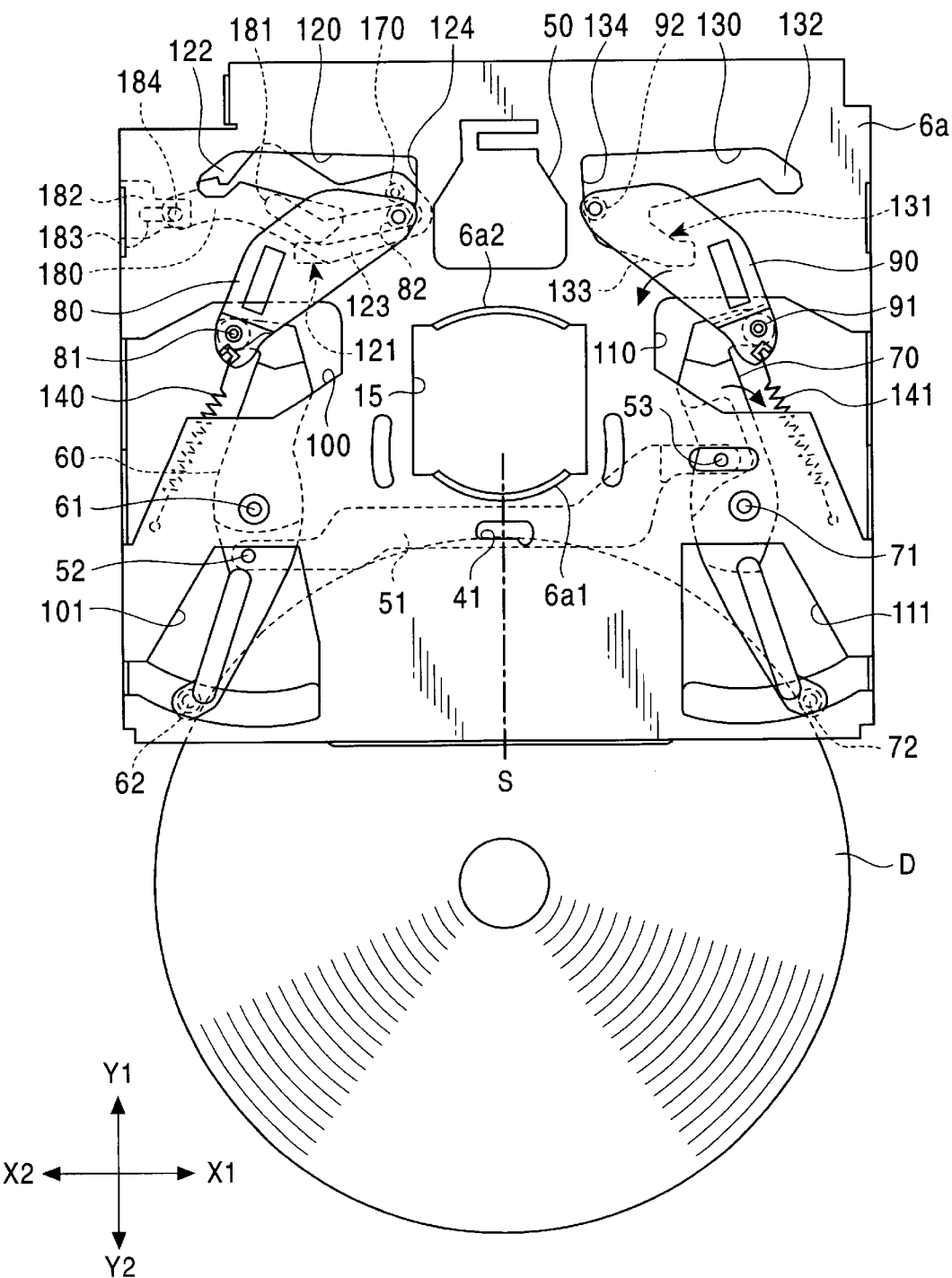
FIG. 9 is a plan view showing a state in which loading of a large-diameter disk is started.

When the detection arms 60 and 70 rotate from the state shown in FIG. 7 to a state shown in FIG. 9, the positioning members 80 and 90 connected to the detection arms 60 and 70 are moved so as to shorten the distance therebetween. In this case, the positioning projections 82 and 92 of the positioning members 80 and 90 slide along front (Y2-side) edges 123 and 133 of the first guide grooves 121 and 131 in the positioning selection grooves 120 and 130 so that they move closer to each other. Then, the positioning projection 82 abuts an inner edge 124 of the positioning selection groove 120, and the positioning projection 92 abuts an inner edge 134 of the positioning selection groove 130.

Figure 10:
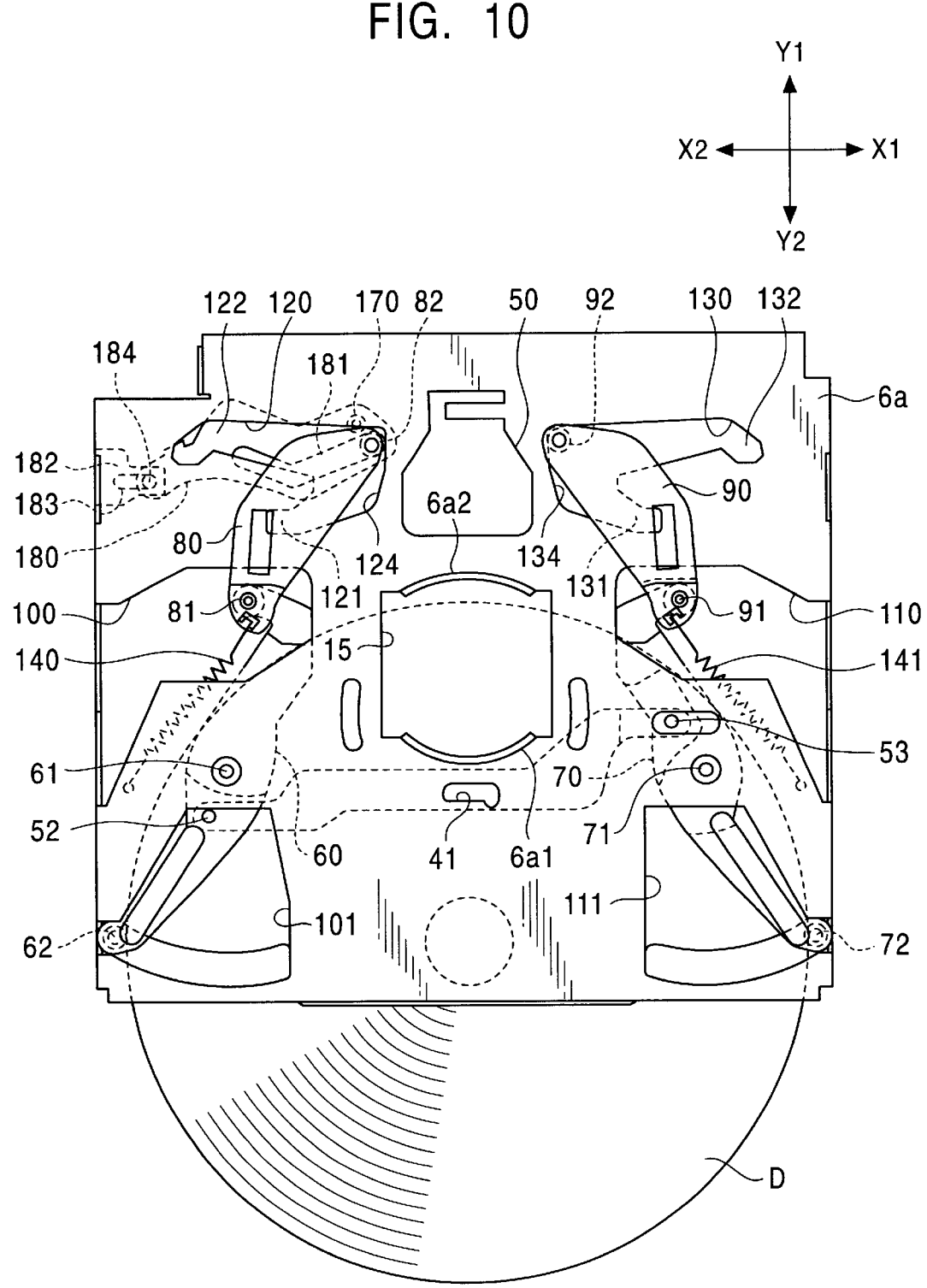
FIG. 10 is a plan view showing a state in which the large-diameter disk is being transferred.

When the disk D is moved to a position shown in FIG. 10, the detection arms 60 and 70 are further rotated, the positioning projection 82 slides rearward along the inner edge 124, and the positioning projection 92 slides rearward along the inner edge 134. In this case, since the connecting pin 81 moves offset from the coil axis of the coil spring 140 (extension line of the coil axis) toward the X2-side, the coil spring 140 applies a clockwise urging force about the connecting pin 81 to the positioning member 80, and the positioning projection 82 slides in the Y1-direction while being slightly and elastically pressed against the inner edge 124. Similarly, the other positioning projection 92 slides in the Y1-direction while being slightly and elastically pressed against the inner edge 134.

Figure 11:
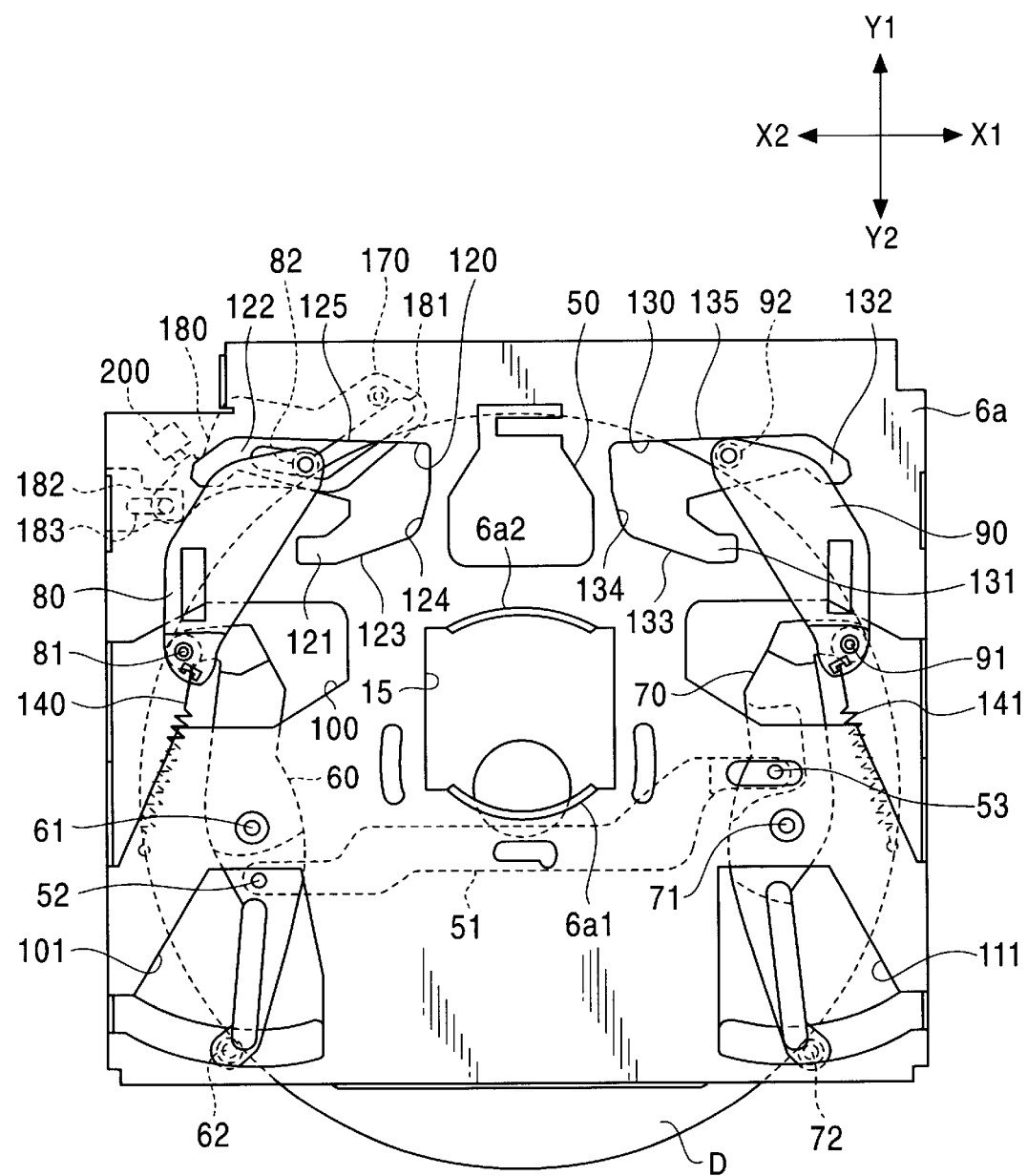
FIG. 11 is a plan view showing a state immediately before positioning of the large-diameter disk is completed.

When the disk D is further transported and the center of the disk D is moved offset from the detecting projections 62 and 72 toward the rear side of the disk apparatus 1, as shown in FIG. 11, the detection arm 60 is returned counterclockwise by the urging force of the coil spring 140, and the detection arm 70 is returned clockwise by the urging force of the coil spring 141. Then, the positioning member 80 connected to the detection arm 60 is moved in the X2-direction, and the positioning member 90 connected to the detection arm 70 is moved in the X1-direction.

Since the peripheral edge of the disk D is in contact with the positioning projections 82 and 92 in the state shown in FIG. 11, the positioning members 80 and 90 pivot further apart from each other while the positioning projections 82 and 92 are pressed in the Y1-direction by the peripheral edge of the disk D. As a result, the positioning projections 82 and 92 are put into the second guide grooves 122 and 132 without returning to the first guide grooves 121 and 131.

Figure 12:
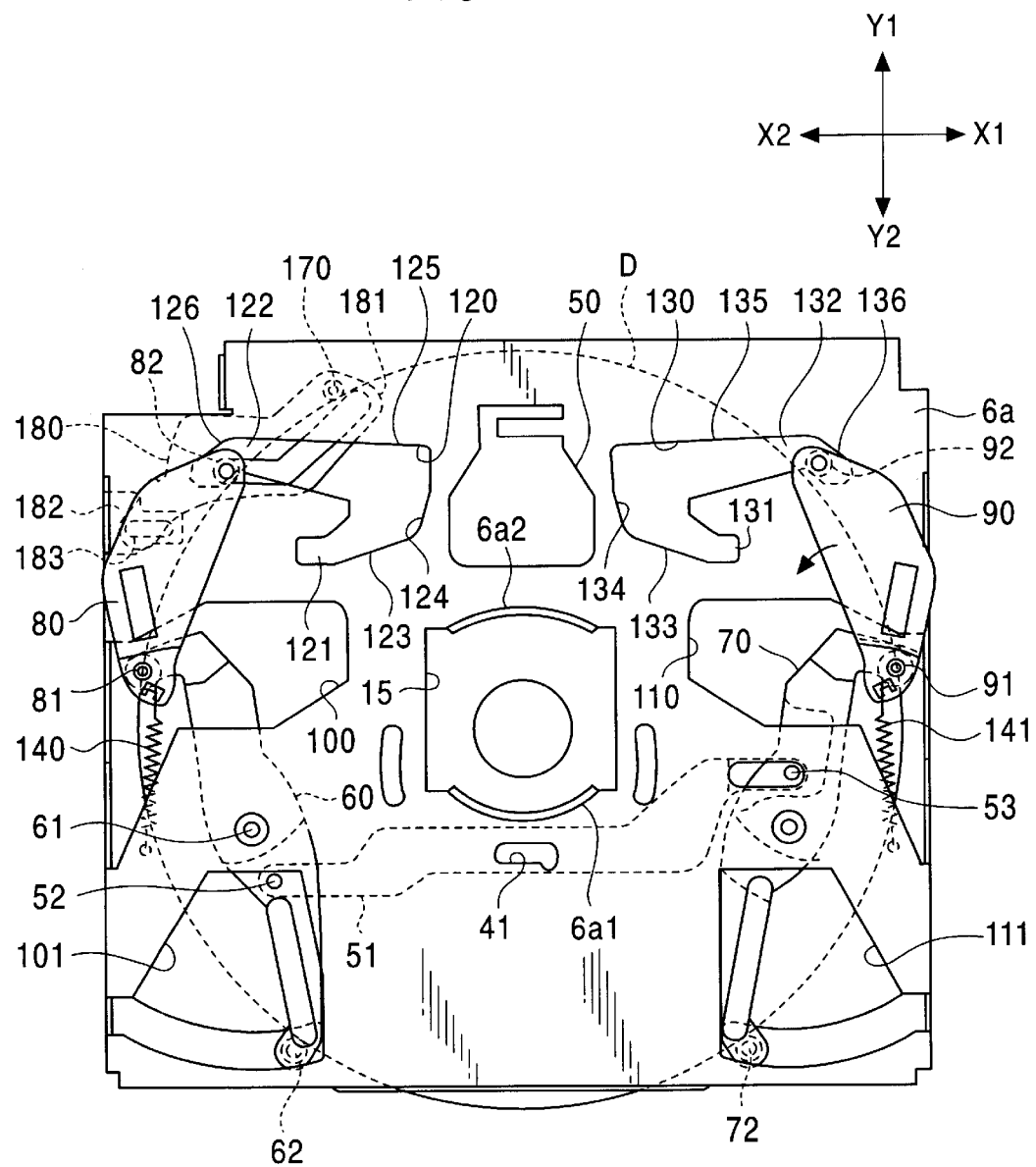
FIG. 12 is a plan view showing a state in which the large-diameter disk is placed in a clamp position.

When the disk D is further moved to a position shown in FIG. 12 and the center of the disk D is substantially aligned with the center of the turntable 4b, the detection arm 60 is further turned counterclockwise, the detection arm 70 is further turned clockwise, the positioning member 80 is further moved in the X2-direction, and the positioning member 90 is further moved in the X1-direction. The positioning projection 82 moves toward the inner side of the second guide groove 122, and the positioning projection 92 is moved toward the inner side of the second guide groove 132. The disk D transported by the roller 7 presses the positioning projection 82 against an inner edge 126 of the second guide groove 122, and similarly presses the positioning projection 92 against an inner edge 136 of the second guide groove 132. At that time, the disk D is positioned so that it is not further transferred toward the rear side of the apparatus.

A description will be given of the operation of loading and positioning a small-diameter disk Ds having a diameter of 8 cm in the disk apparatus 1 with reference to FIGS. 13 to 15.

Figure 13:
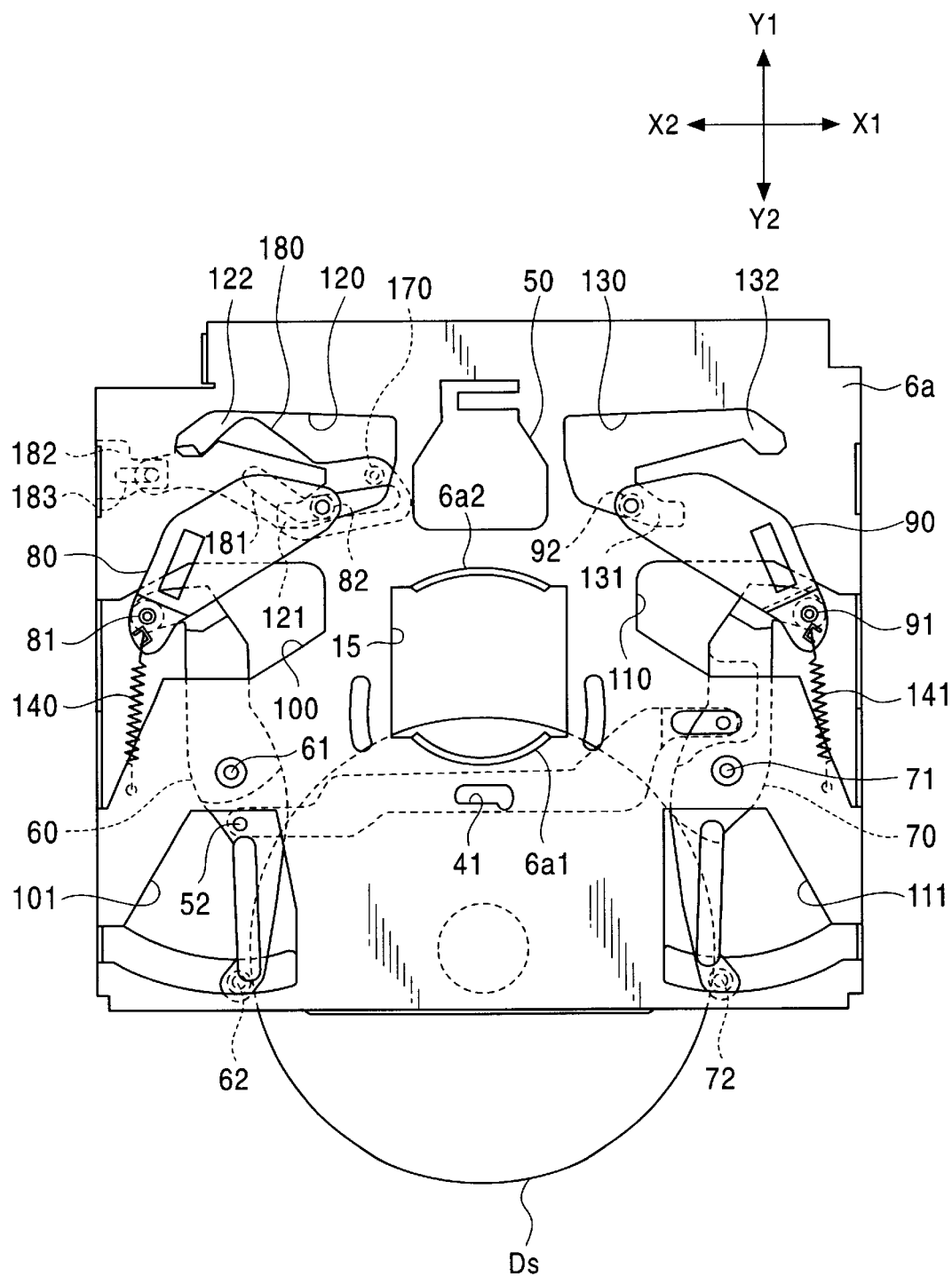
FIG. 13 is a plan view showing a state in which a small-diameter disk is being transferred.

FIG. 13 shows a state in which a small-diameter disk Ds is transported by the roller 7, and the center of the disk Ds is passing between the detecting projections 62 and 72. While the detecting projections 62 and 72 are moved to the outermost side by the peripheral edge of the small-diameter disk Ds in this case, the amount of clockwise rotation of the detection arm 60 and the amount of counterclockwise rotation of the detection arm 70 are small because the diameter of the disk Ds is small.

Accordingly, the amount of X2-direction movement of the positioning member 80 and the amount of X1-direction movement of the positioning member 90 also are small, and the positioning projections 82 and 92 cannot move out of the first guide grooves 121 and 131 of the positioning selection grooves 120 and 130.

Figure 14:
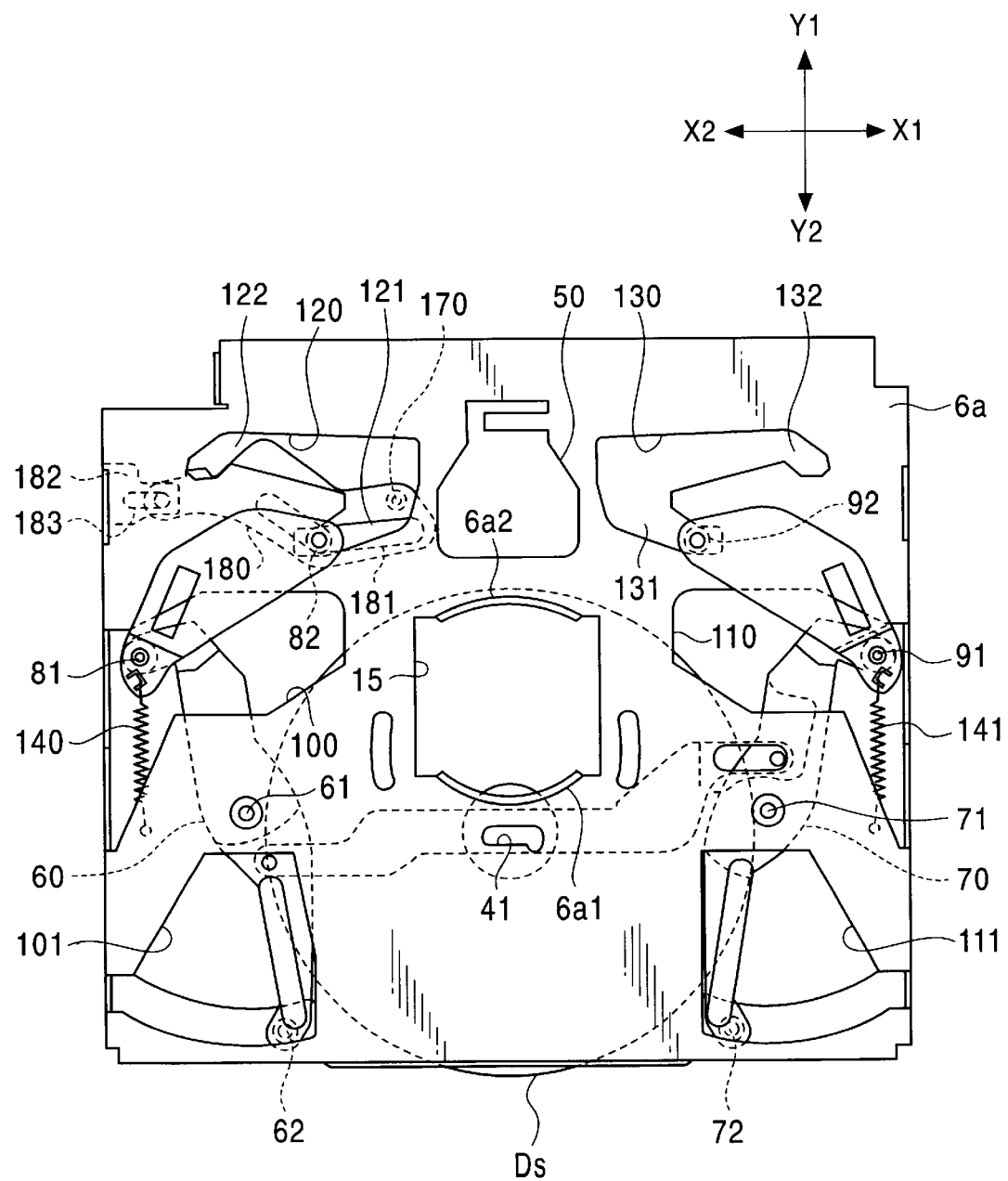
FIG. 14 is a plan view showing a state immediately before positioning of the small-diameter disk is completed.
Figure 15:
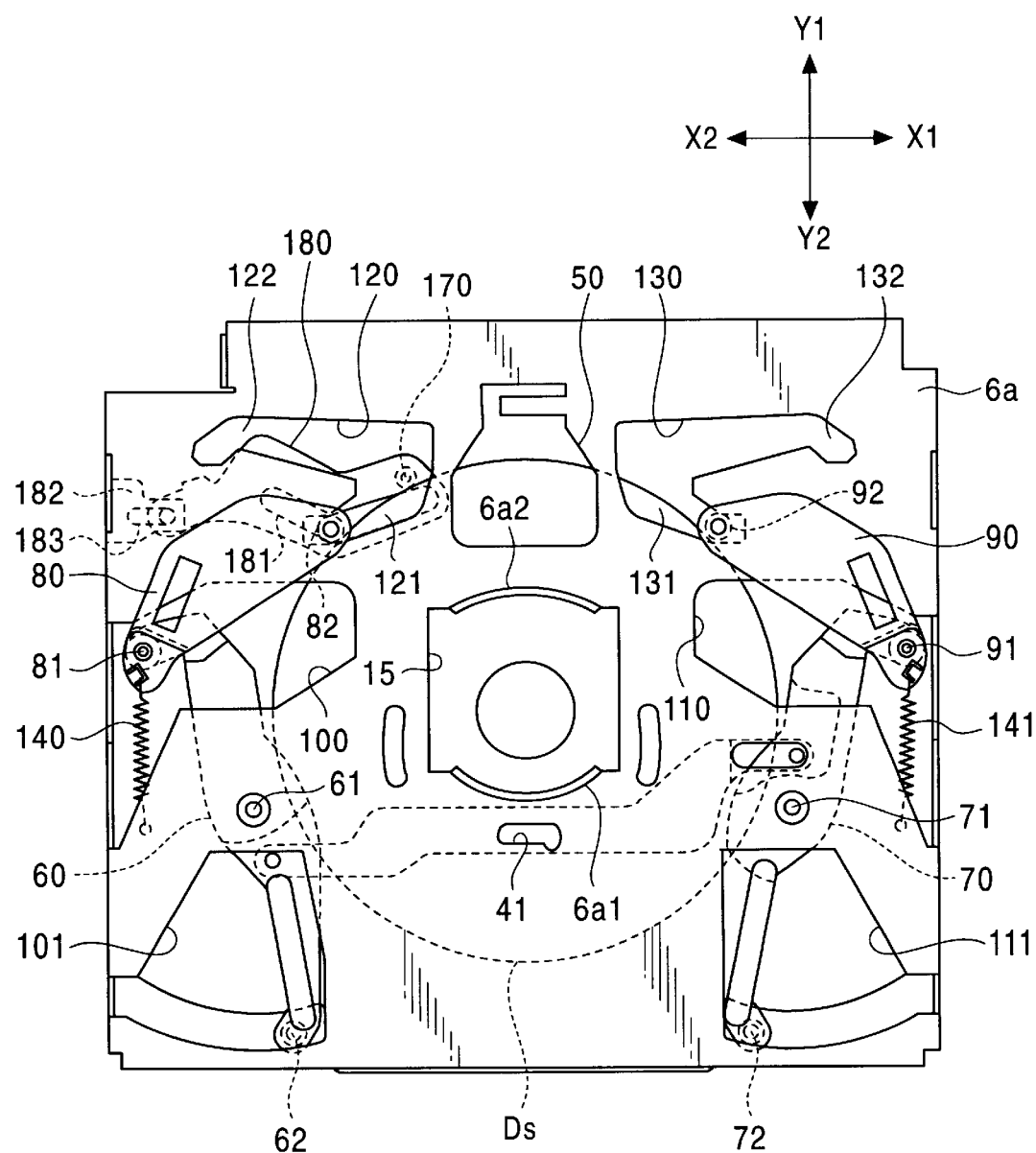
FIG. 15 is a plan view showing a state in which the small-diameter disk is placed in a clamp position

When the disk Ds moves from a position shown in FIG. 14 to a position shown in FIG. 15, and the center of the disk Ds is substantially aligned with the center of the turntable 4b, the detection arm 60 returns counterclockwise, the detection arm 70 returns clockwise, and the positioning members 80 and 90 are moved further apart from each other.

In this case, the positioning projection 82 is restrained by the X2-side end of the first guide groove 121, and the positioning projection 92 is restrained by the X1-side end of the first guide groove 131.

Then, the small-diameter disk Ds transferred in the Y1-direction is positioned in a state in which the peripheral edge thereof presses the positioning projections 82 and 92 against the edge of the first guide groove 121 and the edge of the first guide groove 131.

A description will now be given of the structure and operation of a position detecting section that detects the state of the large-diameter disk D or the small-diameter disk Ds positioned by the positioning projections 82 and 92, as described above.

As shown in FIG. 7, a detection lever 180 is provided on the inner left side of the top plate 6a, and a pin 170 is provided at the leading end thereof.

A support member 182 is provided on the left side of the chassis 6. The support member 182 operates in association with the slide member 9. When the slide member 9 moves toward the rear side of the disk apparatus 1 (toward the Y1-side), the support member 182 also moves toward the rear side. When the slide member 9 moves toward the loading slot 3 (in the Y2-direction), the support member 182 also moves in the Y2-direction.

The support member 182 has a slot 183 extending in the lateral direction. A support shaft 184 formed at the base of the detection lever 180 slidably extends in the slot 183. As shown in FIG. 11, a detection switch 200 to be operated by the detection lever 180 is provided on the lower side of the top plate 6a.

The detection lever 180 has a slide hole 181 shaped like a boomerang. The positioning projection 82 of the positioning member 80 is slidably fitted in the slide hole 181.

FIG. 11 shows the final stage of transfer of a large-diameter disk D. Until the disk D is further transferred in the Y1-direction from the state shown FIG. 11 and reaches the position at which the center of the disk D is substantially aligned with the center of the turntable 4b, the positioning projection 82 is pressed in the Y1-direction by the peripheral edge of the disk D, and the positioning member 80 is pivoted counterclockwise. In this case, the detection lever 180 is pivoted counterclockwise by the positioning projection 82 of the positioning member 80, and the detection switch 200 is operated by the detection lever 180. At this time, it is detected that the disk D is positioned.

When a small-diameter disk Ds is delivered and is further transferred in the Y1-direction from the state shown in FIG. 14, the peripheral edge of the disk Ds abuts the pin 170 immediately before abutting the positioning projection 82. The pin 170 is pushed in the Y1-direction by the transfer force of the disk Ds, the detection lever 180 is pivoted counterclockwise, and the detection switch 200 is actuated by the detection lever 180. Immediately after that, the disk Ds is positioned by the positioning projections 82 and 92, and the detection switch 200 detects that the disk Ds is positioned.

When the detection switch 200 is actuated, the motor for driving the roller 7 is stopped. Then, the motor M starts to move the slide member 9 in the Y2-direction. With this movement, the support member 182 is moved in the Y2-direction together with the slide member 9, as shown in FIGS. 12 and 15. As a result, the detection lever 180 is further pivoted counterclockwise, and the pin 170 separates from the peripheral edge of the small-diameter disk Ds, as shown in FIG. 15. The pin 170 will not abut the peripheral edge of the large-diameter disk D, as shown in FIG. 12.

By the Y2-direction moving force of the slide member 9, the position-switching member 20 is turned counterclockwise, the lifting portion 25 separates from the engaging portion 14, and the clamp arm 11 is biased downward by the biasing force of the biasing member 13. Consequently, the center of the disk D or Ds is clamped between the turntable 4b and the clamper 12.

With the Y2-direction movement of the slide member 9, the roller 7 is moved down further apart from the disk, and the chassis 6 is unlocked and is elastically supported in a floating state inside the housing 2.

When the disk is clamped on the turntable 4b, the detection arm 60 is slightly rotated counterclockwise by the coil spring 140 in the state shown in FIG. 12, and the positioning projection 82 is moved to the X2-side end of the second guide groove 122 and separates from the peripheral edge of the disk D. Similarly, the positioning projection 92 is moved to the X1-side end of the second guide groove 132 and separates from the peripheral edge of the disk D.

In the case of a small-diameter disk Ds, similarly, the detection arms 60 and 70 are rotated, and the positioning projections 82 and 92 are moved to the distal ends of the first guide grooves 121 and 131 and separate from the peripheral edge of the disk Ds, as shown in FIG. 15.

In this way, when the disk D or Ds is clamped on the turntable 4b, it is rotated together with the turntable 4b while it is not in contact with the detecting projections 62 and 72, the positioning projections 82 and 92, and the pin 170, and is subjected to a playback or recording operation by an optical head (not shown).

In order to eject the disk D or Ds, the slide member 9 is moved in the Y1-direction, the position-switching member 20 is turned clockwise, and the clamp mechanism 5 is lifted from a clamping position to an unclamping position. Then, the roller 7 is rotated in a disk ejecting direction, and the disk D or Ds is ejected from the loading slot 3. In this case, the detection arms 60 and 70 are turned clockwise and counterclockwise, respectively. In the case of the large-diameter disk D, the positioning projections 82 and 92 are moved in a direction such as to move out of the second guide grooves 122 and 132.

Subsequently, the disk D or Ds is partly ejected out of the apparatus, and the roller 7 is stopped in the state shown in FIGS. 10 or 13. When the disk D or Ds is drawn out, the state shown in FIG. 7 is brought about again.

While the present invention has been described with reference to what is presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A disk apparatus capable of loading either a large-diameter disk or a small-diameter disk, said disk apparatus comprising:

a chassis;

a rotating section for commonly driving the large-diameter disk or the small-diameter disk;

a pair of detecting projections provided in a disk loading path and biased in a direction such as to move closer to each other, said detecting projections being pressed by a peripheral edge of a loaded disk so that the opposing distance therebetween changes; and a pair of positioning projections provided in the disk loading path and placed offset from said detecting projections toward the inner side in the disk loading direction, said positioning projections being operated to change the opposing distance therebetween by the moving force of said detecting projections when said detecting projections are pressed by the peripheral edge of the disk, wherein, in a top plate substantially parallel to the surface of the loaded disk, said chassis includes a pair of selection grooves corresponding to said positioning projections, each of said selection grooves including a first guide groove and a second guide groove connected to the first guide groove and disposed offset from said first guide groove toward the inner side in the disk loading direction, wherein said selection grooves are shaped so that said positioning projections operate inside said first grooves when the opposing distance between said detecting projections is increased by the small-diameter disk, and so that said positioning projections move out of said first guide grooves and are moved into said second guide grooves by the peripheral edge of the large-diameter disk when the opposing distance between said detecting projections is increased by the large-diameter disk, and wherein the small-diameter disk is positioned so that the center thereof is placed in said rotating section by said positioning projections placed in said first guide grooves, and the large-diameter disk is positioned so that the center thereof is placed in said rotating section by said positioning projections placed in said second guide grooves.

2. A disk apparatus according to claim 1, wherein, when the opposing distance between said detecting projections is increased, said positioning projections are moved closer to each other, said selection grooves are disposed on both sides of a moving center line of the disk, and said first guide grooves and said second guide grooves extend in a direction crossing the moving center line, and are connected adjacent to the moving line.

3. A disk apparatus according to claim 2, wherein said selection grooves are each substantially V-shaped by said first guide grooves and said second guide grooves.

4. A disk apparatus according to claim 1, wherein said detecting projections are provided at one end of each of a pair of detection arms, said positioning projections are provided on a pair of positioning members connected to the respective other ends of said detection arms to move in said selection grooves, and each of the large-diameter disk and the small-diameter disk is positioned by abutting said positioning projections so that the center of the disk is placed in said rotating section.

5. A disk apparatus according to claim 4, wherein said pair of detection arms are operatively connected by a connecting member so that they move closer to or further apart from each other synchronously.

6. A disk apparatus according to claim 4, wherein said detection arms and said positioning members are pivotally supported on a top plate of said chassis.

7. A disk apparatus according to claim 4, wherein said detection arms and said positioning members are pivotally connected by connecting pins, said detection arms are biased through said positioning members by coil springs provided between said positioning members and said chassis in a direction such that said connecting pins are moved closer to each other, and said connecting pins are positioned on the same lines as coil axes of said coil springs.

8. A disk apparatus according to claim 7, wherein said positioning members are provided on one of the top and back sides of a top plate of said chassis, said detection arms are provided on the other of the top and back sides of said top plate, and said connecting pins extend through holes formed in said top plate.

9. A disk apparatus according to claim 4, wherein a clamp piece is formed integrally with each of said positioning members, and a top plate of said chassis is retained between said positioning member and said clamp piece so that said positioning member is supported movably along said top plate.

10. A disk apparatus capable of loading either a large-diameter disk or a small-diameter disk, said disk apparatus comprising:
    a chassis;
    a rotating section for commonly driving the large-diameter disk or the small-diameter disk;
    a pair of detecting projections provided in a disk loading path and biased in a direction such as to move closer to each other, said detecting projections being pressed by a peripheral edge of a loaded disk so that the opposing distance therebetween changes; and
    a pair of positioning projections provided in the disk loading path and placed offset from said detecting projections toward the inner side in the disk loading direction, said positioning projections being moved closer to each other when said detecting projections are pressed by the peripheral edge of the disk to increase the opposing distance therebetween,
    wherein, in a top plate substantially parallel to the surface of the loaded disk, said chassis includes a pair of selection grooves corresponding to said positioning projections and provided on both sides of a moving center line of the disk, each of said selection grooves including a first guide groove extending in a direction crossing the moving center line and a second guide groove disposed offset from said first guide groove toward the inner side in the disk loading direction, extending in the direction crossing the moving center line, and connected to said first guide groove close to the moving center line,
    wherein said selection grooves are shaped so that said positioning projections operate inside said first grooves when the opposing distance between said detecting projections is increased by the small-diameter disk, and so that said positioning projections move out of said first guide grooves and are moved into said second guide grooves by the peripheral edge of the large-diameter disk when the opposing distance between said detecting projections is increased by the large-diameter disk, and
    wherein the small-diameter disk is positioned by said positioning projections placed in said first guide grooves so that the center thereof is placed in said rotating section, and the large-diameter disk is positioned by said positioning projections placed in said second guide grooves so that the center thereof is placed in said rotating section.

11. A disk apparatus according to claim 10, wherein said selection grooves are each substantially V-shaped by said first guide grooves and said second guide grooves.

12. A disk apparatus according to claim 10, wherein said detecting projections are provided at one end of each of a pair of detection arms, said positioning projections are provided on a pair of positioning members connected to the respective other ends of said detection arms to move in said selection grooves, and each of the large-diameter disk and the small-diameter disk is positioned by abutting said positioning projections so that the center of the disk is placed in said rotating section.

13. A disk apparatus according to claim 12, wherein said pair of detection arms are operatively connected by a connecting member so that they move closer to or further apart from each other synchronously.

14. A disk apparatus according to claim 12, wherein said detection arms and said positioning members are pivotally supported on a top plate of said chassis.

15. A disk apparatus according to claim 12, wherein said detection arms and said positioning members are pivotally connected by connecting pins, said detection arms are biased through said positioning members by coil springs provided between said positioning members and said chassis in a direction such that said connecting pins are moved closer to each other, and said connecting pins are positioned on the same lines as coil axes of said coil springs.

16. A disk apparatus according to claim 15, wherein said positioning members are provided on one of the top and back sides of a top plate of said chassis, said detection arms are provided on the other of the top and back sides of said top plate, and said connecting pins extend through holes formed in said top plate.

17. A disk apparatus according to claim 12, wherein a clamp piece is formed integrally with each of said positioning members, and a top plate of said chassis is retained between said positioning member and said clamp piece so that said positioning member is supported movably along said top plate.

18. A disk apparatus capable of loading either a large-diameter disk or a small-diameter disk, said disk apparatus comprising:

a chassis;

a rotating section for commonly driving the large-diameter disk or the small-diameter disk;

a pair of detecting projections provided in a disk loading path and biased in a direction such as to move closer to each other, said detecting projections being pressed by a peripheral edge of a loaded disk so that the opposing distance therebetween changes; and a pair of positioning projections provided in the disk loading path and placed offset from said detecting projections toward the inner side in the disk loading direction, said positioning projections being operated to change the opposing distance therebetween by the moving force of said detecting projections when said detecting projections are pressed by the peripheral edge of the disk, wherein said detecting projections are provided at one end of each of a pair of detection arms, and said positioning projections are provided on a pair of positioning members connected to the respective other ends of said detection arms;

said chassis includes, in a top plate substantially parallel to the surface of the loaded disk, a pair of selection grooves corresponding to said positioning projections, each of said selection grooves including a first guide groove and a second guide groove connected to said first guide groove and disposed offset from said first guide groove toward the inner side in the disk loading direction;

said selection grooves are shaped so that said positioning projections operate inside said first grooves when the opposing distance between said detecting projections is increased by the small-diameter disk, and so that said positioning projections move out of said first guide grooves and are moved into said second guide grooves by the peripheral edge of the large-diameter disk when the opposing distance between said detecting projections is increased by the large-diameter disk; and the small-diameter disk is positioned by abutting said positioning projections placed in said first guide grooves so that the center thereof is placed in said rotating section, and the large-diameter disk is positioned by abutting said positioning projections placed in said second guide grooves so that the center thereof is placed in said rotating section.

19. A disk apparatus according to claim 18, wherein, when the opposing distance between said detecting projections is increased, said positioning projections are moved closer to each other, said selection grooves are disposed on both sides of a moving center line of the disk, and said first guide grooves and said second guide grooves extend in a direction crossing the moving center line, and are connected adjacent to the moving line.

20. A disk apparatus according to claim 19, wherein said selection grooves each are substantially V-shaped by said first guide grooves and said second guide grooves.

21. A disk apparatus according to claim 18, wherein said pair of detection arms are operatively connected by a connecting member so that they move closer to or further apart from each other synchronously.

22. A disk apparatus according to claim 18, wherein said detection arms and said positioning members are pivotally supported on a top plate of said chassis.

23. A disk apparatus according to claim 18, wherein said detection arms and said positioning members are pivotally connected by connecting pins, said detection arms are biased through said positioning members by coil springs provided between said positioning members and said chassis in a direction such that said connecting pins are moved closer to each other, and said connecting pins are positioned on the same lines as coil axes of said coil springs.

24. A disk apparatus according to claim 23, wherein said positioning members are provided on one of the top and back sides of a top plate of said chassis, said detection arms are provided on the other of the top and back sides of said top plate, and said connecting pins extend through holes formed in said top plate.

25. A disk apparatus according to claim 18, wherein a clamp piece is formed integrally with each of said positioning members, and a top plate of said chassis is retained between said positioning member and said clamp piece so that said positioning member is supported movably along said top plate.

* * * * *